United States Patent [19]

van der Weide et al.

[11] Patent Number: 4,953,516

[45] Date of Patent: Sep. 4, 1990

[54] INTELLIGENT CONTROL OF MOTOR VEHICLE GAS EQUIPMENT

[75] Inventors: Jouke van der Weide, Rijswijk; Adrianus J. T. Hoogeboom, Harmelen, both of Netherlands

[73] Assignee: Necam B.V., Utrecht, Netherlands

[21] Appl. No.: 364,319

[22] Filed: Jun. 12, 1989

[30] Foreign Application Priority Data

Jun. 17, 1988 [NL] Netherlands .......................... 8801554

[51] Int. Cl.⁵ .......................................... F02M 21/02
[52] U.S. Cl. ...................................... 123/527; 123/442
[58] Field of Search ........................ 123/525, 527, 442

[56] References Cited

U.S. PATENT DOCUMENTS

| 4,489,700 | 12/1984 | van der Weide | 123/527 |
| 4,513,728 | 4/1985 | Ullman et al. | 123/527 |
| 4,541,397 | 9/1985 | Young | 123/525 |
| 4,545,356 | 10/1985 | Casey | 123/527 |
| 4,617,904 | 10/1986 | Pagdin | 123/525 |

FOREIGN PATENT DOCUMENTS 101020  9/1979  Japan .

*Primary Examiner*—E. Rollins Cross
*Attorney, Agent, or Firm*—Young & Thompson

[57] ABSTRACT

Device for the intelligent control of a venturi-type carburettor unit for a gaseous fuel, including a pressure regulator, a main throttle valve in the airsuction pipe for control of the engine output and a regulating valve in the gas supply pipe between the pressure regulator and the venturi, this valve being coupled to the main throttle valve. By adjusting this mechanical system for providing a too rich air-fuel-mixture under all conditions, only mirror adjustments of the mixture are necessary to provide the engine with the correct mixture required for each load/speed condition. These requirements are stored in a processor, and the latter controls the necessary corrections of the mixture by diluting the gasflow to the main venturi with some air. To this end a small venturi is placed in the gaspipe, the gasflow sucking the diluting air through a mixing air regulating valve, which valve is controlled by the processor in a continuous, analogic intelligent way. Optionally an O₂-sensor placed in the exhaust gases may send feed-back signals to the processor.

5 Claims, 1 Drawing Sheet

U.S. Patent
Sep. 4, 1990
4,953,516
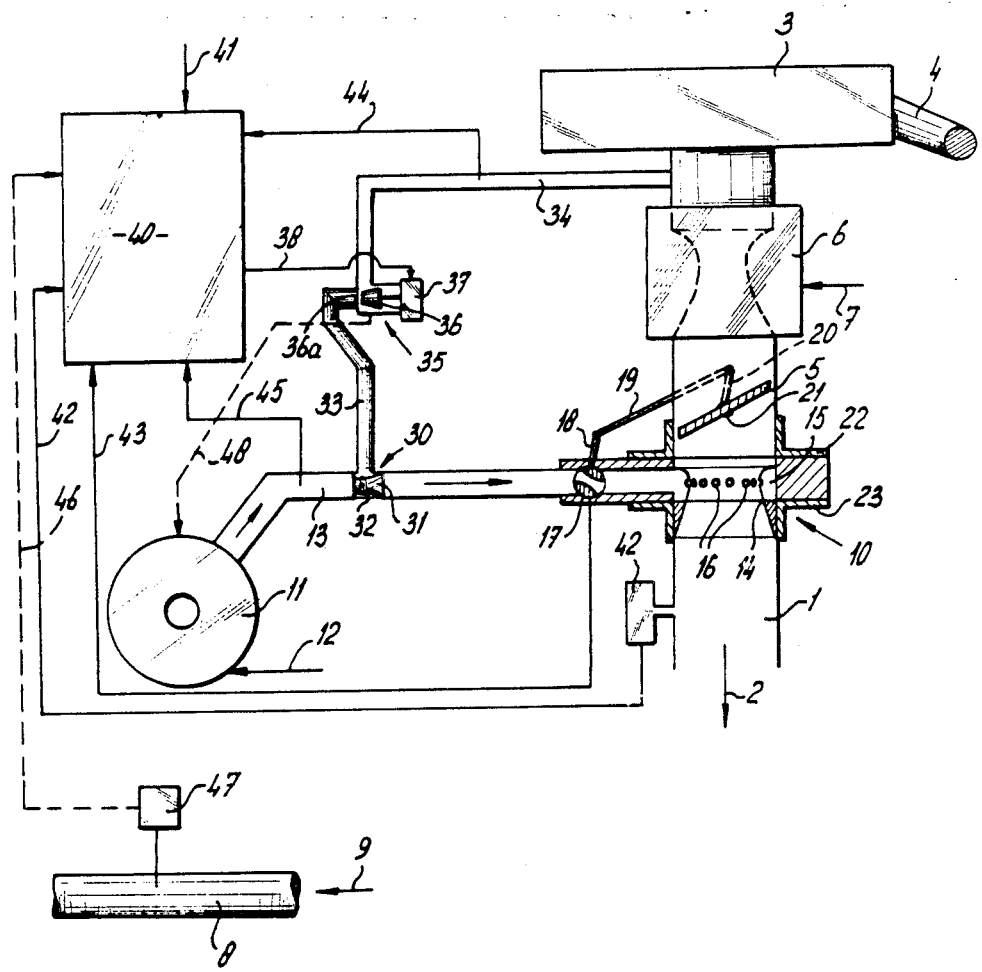

INTELLIGENT CONTROL OF MOTOR VEHICLE GAS EQUIPMENT

The invention relates to a device for the intelligent control of a carburettor unit for a gaseous fuel, in particular LPG, for an internal-combustion engine, comprising a vaporizer/pressure regulator which may or may not be combined, suitable for the conversion of liquid or non-liquid gas at tank pressure into vapour form (hereinafter called "gas") at a pressure near the air pressure upstream relative to the carburettor unit, a connecting line for infeed of the gas to a venturi-type mixing device for mixing the gas with the combustion air sucked in by the engine, a main throttle valve for the intake combustion air to control the engine output, said main throttle valve being coupled to the accelerator pedal and being situated upstream relative to the venturi gas mixing device, and a regulating valve for the quantity of gas supplied during running to the mixing device, which is coupled to the main throttle valve.

Such a gas carburettor unit is generally used and is known from, inter alia publications of the Dutch manufacturers Necam at Nieuwegein and from "Reviue Technique Automobile", vol. 42, Nr. 475, January 1987, page 37, both figures, Bologne-Billancourt. Unlike many other gas carburettor units, in the above-described unit the mixing device of the venturi-type for mixing the gas with the combustion air sucked in by the engine is placed downstream relative to the main throttle valve. Since the mixing device is thus partly influenced by the position of the main throttle valve, the venturi mixing device cannot without further ado suck in gas from the low-pressure regulator, but this gas flow must be controlled by a regulating valve which is coupled mechanically to the main throttle valve of the engine. Since in all running conditions of the engine a mixture must be fed to the engine, the passage of the regulating valve is shaped in the correct way for it. This shaping has to be adapted to each engine type and this, of course, constitutes a complication of the system being looked at. In practice, and in the long run, it will not be possible to supply accurately to the engine the gas/air mixture required by it. The exhaust gas composition will therefore not be optimum and will no longer be able to meet the increasingly stricter environmental standards. Where motor vehicle gas systems previously were capable of producing more ecologically benign exhaust gases than those from petrol-run engines, with the modern electronically controlled petrol carburettor or petrol injection systems petrol-run engines have appreciably better exhaust gas compositions than is possible with the above-described carburettor unit. The petrol systems here are intelligently controlled, in other words, they react to changing running circumstances of the engine and adapt the fuel/air mixture supplied to the characteristic performance graph of the engine concerned.

The object of the invention is then at least to make up the ground lost by a gas carburettor unit relative to a petrol system, and preferably more than that.

According to the invention, the gas carburettor unit described in the preamble is characterized in that the intelligent part of the control means is formed by a correction device containing a supply device for mixing air which is accommodated in the gas supply pipe between the pressure regulator and the gas regulating valve, and the mixing air supply pipe contains a mixing air regulating valve, while the gas regulating valve is dimensioned in such a way that in all running conditions of the engine too rich a gas/air mixture can be supplied by it, and in which the correction device lowers the "quality" of the infed gas in such a way by dilution with mixing air that the engine can always be supplied with the desired gas/air mixture by the mixing device, and in that the mixing air supply device is a small venturi with annular channel, through the throat of which the gas supply flow is guided in order to suck the mixing air in through the annular channel.

In the invention a correction system is deliberately selected, which is controlled in an intelligent manner. For this, use is made of the known device described in the preamble, so that in the event of unexpected failure of the intelligent correction device, the vehicle can still be driven and can reach a garage for repair. According to the invention, the existing unit is to this end adjusted in such a way with the gas regulating valve that in all running conditions of the engine too rich a gas/air mixture is supplied. Here we should be thinking of a mixture which is between several per cent to several times ten per cent too rich. In order to obtain an optimum exhaust gas composition, this too rich basic mixture must be corrected, and according to the invention this takes place through the "quality" of the infed gas being lowered through dilution of the gas with mixing air. This retains the advantage of the rapid response of the engine to changes in the position of the main throttle valve via the accelerator pedal. The gas regulating valve in fact remains in the known place right next to the venturi mixing device and mechanically coupled to the main throttle valve. The position of the mixing air supply on the gas pipe to the gas regulating valve now does not have to be placed in the immediate vicinity, which in many cases is a great advantage for installation in a vehicle. It is, of course, desirable to keep this distance as short as possible, in order to obtain a rapid response of the corrected device.

A comparable control system is known from "Patent Abstracts of Japan", vol. 3, Nr. 122 (M-76), Oct. 13, 1979, page 160 M76 and JP-A-No. 54.101.020 (Jidosha Kogai Anzen Kiki Gijutsu Kenkju Kumia) 09-08-1979. From this publication a non-intelligent feed-back control is known, according to which the fuel-air mixture delivered to the engine is kept within a narrow range of the theoretical air-fuel ratio, by controlling an air bleed flow into the fuel path under control of a signal from an $O_2$-sensor.

However, this control system is a non-analogous on-off-control method, as shown in the figure in combination with the electrical scheme. Further it is fully dependent from the feed-back signal from an $O_2$-sensor. When the $O_2$-sensor fails, the whole system must fail.

The present invention therefore proposes an intelligent continuous or modulating system, based on fuel-dilution with some air, by providing a system which is autonomous and does not in the first instance rely on a feed-back signal.

The use of another venturi here, also means that the system by itself maintains a constant mixing air/fuel ratio so long as the resistance or the pressure does not change at the gas side and at the air side. At the air side the pressure is constant, while at the gas side the pressure is kept constant by the pressure regulator. For that reason, the earlier mentioned mixing air regulating valve is accommodated at the air side in the supply pipe for the mixing air. This means that the degree of dilution or depletion of the infed fuel gas to the venturi mixing device is regulable, in order in this way to reduce the too rich basic setting to precisely the desired value. Since the control takes place in small air flows, relatively small and thus rapid and accurate means are adequate. For this purpose, the mixing air regulating valve is formed by a throttle valve which is adjustable by an adjusting motor, preferably a stepping motor, while there is an electronic control unit or processor for control of the motor which is pre-programmed with one or more performance graphs of the internal-combustion engine and receives signals on current running conditions of the engine. Such small adjustable throttle valves provided with a stepping motor, which are intended for small outputs, are already known and are used in large numbers in intelligent petrol carburettor systems. They are therefore tested for use in automobiles. The stepping motor preferably closes the air throttle valve completely when the internal-combustion engine is at a standstill.

The essential information which must be supplied to the processor constitutes signals of the engine speed and the inlet depression for the engine. Only then does the processor have a good indication of the quantity of intake air and the speed at which the engine is running. The processor can additionally be fed with a signal giving the position of the main throttle valve or the gas regulating valve connected mechanically to it. With this information the processor on the basis of the performance graph can give the correct command to the stepping motor of the mixing air regulating valve in order in this way to cause a certain depletion of the fuel supply, so that the engine is supplied with exactly the right air/fuel mixture. Further refinements can be to feed a signal which gives the temperature of the intake combustion air and the temperature of the fuel gas as it emerges from the pressure regulator.

Measuring instruments for the intake air mass are known per se, and they could also be used for sending a signal instead of the combination of the motor speed and the inlet depression.

In contrast to the earlier mentioned Japanese system, the system according to the invention relies for the main control on a fully mechanical air-fuel control, which is only corrected by the intelligent pre-programmed part of the device. Its accuracy, also over time, is much better than with the Japanese system. No feed-back signal is used up to here, since it is not necessary.

Only, if catalytic converters are used to cleanse the exhaust gases further, in that case an $O_2$-sensor or lambda probe will generally be placed in the exhaust in order also to give a signal to the processor concerning the oxygen concentration of the exhaust gases. This is the only feed-back signal in the whole control circuit.

The performance graph of the engine concerned can be programmed in the processor by means of electronic memory chips. An "Eprom" (erasable programmable read-only memory) can be used for this.

Finally, the control range of the mixing air venturi together with the gas pressure regulator, which releases gas only if a certain vacuum is maintained at the outlet of the regulator by the venturi mixing device when the engine is running, can be increased if according to a preferred embodiment the air chamber of the low-pressure diaphragm of the gas pressure regulator is connected to the mixing air throttle valve by a measuring line. With this measure there can also be compensation for certain pressure losses as a result of the flow resistance of the air in the air filter.

A preferred embodiment of the device for the intelligent control of a gas carburettor unit according to the invention will be explained in greater detail below with reference to the accompanying diagram.

Only the intake pipe 1 of the internal-combustion engine, not shown, is shown schematically. An air/fuel mixture 2 flows through it to the cylinders. The air filter 3 with the intake stump 4 are also shown schematically. The intake pipe 1 as usual contains the main throttle valve 5, which in a manner not shown is connected to the accelerator pedal of the vehicle. A petrol carburettor 6, provided with a petrol supply pipe 7, is shown schematically between the air filter and the main throttle valve 5. It should, however, be emphasized that the invention can also be used for motor vehicles without petrol carburettor, in which case the carburettor 6 is not present and can possibly be replaced by a measuring instrument for the air mass flowing past. It will be clear to the expert that the engine can also be provided with any type of petrol injection device. In all those cases the main throttle valve 5 is, however, at the place indicated in the figure.

The only other part which belongs to the engine not shown is a part of the exhaust pipe 8, through which the exhaust gas flow is discharged.

Downstream relative to the main throttle valve 5, the gas mixing device 10 is placed in the intake pipe of the engine. It is generally made low in height, so that it can be placed between flanges 22 and 23 present in the intake pipe 1 without the petrol carburettor and the air filter being placed too high for space to be found under a vehicle hood (not shown). The gas mixing device is of the venturi type.

In the schematically shown vaporizer/pressure regulator 11 the gas, which in the case of LPG is fed as a liquid from the tank through the pipe 12, is vaporized and reduced in pressure. The pressure regulator is adjusted in such a way that a partial vacuum has to prevail in the downgoing gas supply pipe 13 for the pressure regulator to release gas. Via the gas supply pipe 13 the gas is sucked in by the venturi 14 into the annular channel 15 thereof and released to the combustion air flow through the bores 16. Placed in the gas supply pipe, just before the annular channel 15 of the venturi, is a gas regulating valve 17 which is provided with an adjusting lever 18, which is coupled mechanically by means of a bar 19 to a lever 20 which is on the shaft 21 of the main throttle valve 5. When the accelerator pedal (not shown) is depressed the shaft 21 of the main throttle valve 5 is turned and thus takes the gas regulating valve 17 with it in its movement. Thanks to the mechanical coupling and the position of the gas regulating valve 17 next to the venturi, the response of the gas regulating valve to shifts of the accelerator pedal is optimum. Although this is not shown, the passage of the spool of the gas regulating valve 17 is shaped in a known manner in such a way that the desired quantity of gas is fed in each time to the combustion air as a function of the position of the main throttle valve 5. According to the invention, said adjustment to the engine performance graph is such that in all conditions too rich a gas/air mixture will be supplied to the engine if gas alone flows through the gas supply pipe 13.

However, according to the invention, the gas supply pipe 13 contains a mixing air supply device 30, which is preferably in the form of a small venturi 31, provided with an annular channel 32. Connected to this annular channel is a supply pipe for the mixing air 33 which is connected by means of the pipe 34 to the exhaust pipe of the air filter 3. The gas released by the vaporizer 11 is "diluted" through the supply of mixing air, so that in this way the too rich gas/air mixture 2 can be brought to the desired value according to the performance graph of the engine. The system used could be called a quality control. In order to bring the too rich gas/air mixture 2 in all running conditions of the engine to the value which the engine performance graph requires, the mixing air supply through the pipe 33 must be controlled, and this takes place by means of the mixing air regulating valve 35. The latter is provided with a valve seat 36a, with which a valve 36 mates. The valve 36 can be opened more or less by means of a schematically shown stepping motor 37, in order in this way to permit adjustment of the quantity of mixing air. Since small outputs of mixing air and gas are involved here, both the mixing air venturi and the mixing air regulating valve, including their pipes, are all relatively small, so that they can easily be fitted in the engine space of a vehicle. The stepping motor 37 is controlled by a command line 38 from an electronic control unIt or processor 40. The latter is pre-programmed in a known manner with the performance graph of the engine concerned in which the unit is installed. The main engine running data which the processor 40 must have in order to be able to control the mixing air regulating valve 35 properly comprise a signal 41 which is representative of the engine speed, a signal 42 coming from a sensor of the current vacuum prevailing in the intake pipe 1 of the engine, and possibly a signal 43 which is representative of the position of the main throttle valve 5 or of the gas regulating valve 17. In order to be able to make further refinements in the control commands transmitted via 38, the processor is also preferably fed with signals 44 of the temperature of the infed combustion air, a signal 45 of the temperature of the infed gas, and possibly also a signal 46 coming from a lambda probe 47 which measures the oxygen concentration in the exhaust gas flow 9. The latter is particularly important if the engine is provided with a catalytic converter, not shown. Even without a catalytic converter, it can be advantageous to provide the engine with the lambda probe 47, because the measurement of the exhaust gas composition can be regarded as a further refinement of the control process effected according to the performance graph of the engine present in the processor. Where the adjustment device 30, 35 with the mixing air involves a relatively minor correction, based on the performance graph of the too rich basic gas/air mixture as it will be fed to the engine, the correction via the lambda probe 47 can be regarded as a correction of the desired value, known through the performance graph in the computer, and the measured results thereof in the exhaust gases flow 9.

Finally, it is a good idea in some circumstances to fit a measuring line 48 which transmits the absolute air pressure downstream of the air filter 3 as a signal to the gas pressure regulator. This can compensate for a gradual clogging of the air filter 3 through pollution, while this line 48 is necessary in the event of the engine being provided, in a manner not shown, with pressure charging. In that case the compressor would have to be located between the air filter 3 and the connection of the mixing air intake pipe 34 to the intake pipe 1 of the engine.

It will be clear to the expert that, because the correction with the mixing air relates only to an autonomous main system which is several to several tens of per cent too rich, the engine will be able to continue running in the event of failure of the correction device. The invention thus provides an integral fail-safe system.

We claim:

1. In a device for the control of a carburetor unit for a gaseous fuel, for an internal combustion engine, comprising a vaporizer/pressure regulator for the supply of gas at a pressure near the air pressure upstream of the carburetor unit, a venturi type mixing device for mixing the gas with combustion air sucked in by a said internal combustion engine, a connecting line for connecting the vaporizer/pressure regulator to said mixing device, a main throttle valve for the intake of combustion air to control the engine output, said main throttle valve being adapted to be coupled to an accelerator pedal and being situated upstream of said mixing device, and a regulating valve in said connecting line for regulating the quantity of gas supplied to the mixing device, said regulating valve being coupled to said main throttle valve; the improvement comprising a mixing air supply device in said connecting line between said vaporizer/pressure regulator and said regulating valve, said supply device comprising a further venturi and an annular channel having a throat through which said gas flows between said vaporizer/pressure regulator and said regulating valve, a mixing air supply pipe that supplies air to said air supply device, said further venturi sucking said mixing air into said annular channel, a mixing air regulating valve in said mixing air supply pipe, the first-mentioned regulating valve being so dimensioned as to be adapted to supply too rich a gas/air mixture to the engine, and correction means controlling the opening of said mixing air regulating valve to dilute said gas with mixing air, thereby to supply to the engine a leaner gas/air mixture.

2. A device as claimed in claim 1, in which said mixing air regulating valve comprises a throttle valve, an adjusting motor for adjusting said throttle valve, said correction means comprising an electronic control unit pre-programmable according to desired performance of the engine.

3. A device according to claim 2, in which said electronic control unit receives at least a signal from a sensor which measures the pressure prevailing in an intake pipe of the engine downstream of the first-mentioned venturi and from a sensor which measures the speed of the engine.

4. A device as claimed in claim 3, the engine having a measuring instrument for the mass of air sucked in, which emits a signal to said control unit as a function of the engine load and the engine speed.

5. A device according to claim 2, said electronic control unit being also fed with signals coming from sensors fitted on the engine to report back the position of the main throttle valve and to measure the temperature of intake gas to the engine and the oxygen content of exhaust gases from the engine.

* * * * *